United States Patent
Rai et al.

(10) Patent No.: US 8,825,064 B2
(45) Date of Patent: Sep. 2, 2014

(54) FEMTOCELL MEASUREMENTS FOR MERGER INTEGRATION PLANNING

(75) Inventors: Paritosh Rai, Dunwoody, GA (US); Arthur Brisebois, Cumming, GA (US)

(73) Assignee: AT&T Mobility LLC, Atlanta, GA (US)

( * ) Notice: Subject to any disclaimer, the term of this patent is extended or adjusted under 35 U.S.C. 154(b) by 364 days.

(21) Appl. No.: 13/222,555

(22) Filed: Aug. 31, 2011

(65) Prior Publication Data

US 2013/0053047 A1    Feb. 28, 2013

(51) Int. Cl.
*H04M 11/00* (2006.01)

(52) U.S. Cl.
USPC .............................. 455/448; 455/423; 455/447

(58) Field of Classification Search
CPC ...................................................... H04W 24/10
USPC ............................................ 455/423, 447, 448
See application file for complete search history.

(56) References Cited

U.S. PATENT DOCUMENTS

| | | | |
|---|---|---|---|
| 6,477,367 B1 * | 11/2002 | Kim ............................... | 455/423 |
| 6,950,678 B1 | 9/2005 | Mujtaba et al. | |
| 8,412,221 B2 * | 4/2013 | Fan et al. .................... | 455/452.1 |
| 2009/0296635 A1 | 12/2009 | Hui et al. | |
| 2010/0136996 A1 * | 6/2010 | Han et al. .................... | 455/452.1 |

OTHER PUBLICATIONS

"Broadband-eQ Network Planning Software", http://www.equilateral.com/broadband.html#optimization. Last accessed Dec. 30, 2011, 2 pages.
"Mentum CellPlanner", http://www.mentum.com/index.php?p.=mentum-planet&hl=en_US. Last accessed Dec. 30, 2011, 1 page.
"CelPlanner", http://www.celplan.com/Products/CP.asp?Plan=true. Last accessed Dec. 30, 2011, 1 page.
"Mentum Cell Planner", http://www.mentum.com/index.php?page=cellplanner&hl=en_US. Last accessed Dec. 30, 2011, 1 page.
OA dated Jul. 12, 2012 for U.S. Appl. No. 13/312,858, 29 pages.
Equilateral Technologies, "Wireless Network Planning and Optimization—RF Propagation Prediction", http://www.equilateral.com/broadband.html#optimization, last accessed Mar. 2, 2012.
Office Action dated Mar. 18, 2013 for U.S. Appl. No. 13/312,858, 22 pages.
Office Action dated Aug. 1, 2013 for U.S. Appl. No. 13/312,858, 25 pages.
Office Action dated Oct. 23, 2013 for U.S. Appl. No. 13/272,273, 38 pages.

(Continued)

*Primary Examiner* — Amancio Gonzalez
(74) *Attorney, Agent, or Firm* — Amin, Turocy & Watson, LLP

(57) ABSTRACT

A system and methodology that utilizes data collected by a femto access point (FAP) to identify and prioritize cell sites that can be acquired to improve indoor coverage of an existing communication network is provided. Moreover, the data can include femto network listen measurements that can be utilized to compare the macro coverage provided by the existing communication network with the radio coverage provided by a disparate communication network, for example, by the cell sites of an operator being considered for acquisition. In addition, a number of attachment attempts made to the FAP within a specified period can be calculated. Moreover, this information can be leveraged to make merger/acquisition decisions, including quantifying the number of sites of the disparate communication networks to operate and/or predicting the incremental performance gain opportunities that result due to the operation of the sites of the disparate communication networks.

20 Claims, 14 Drawing Sheets

(56) References Cited

OTHER PUBLICATIONS

Chiao, et al., "MEMS Reconfigurable Vee Antenna," 1999 IEEE MTT-S Digest, 1515-1517.

Office Action dated Dec. 19, 2013 for U.S. Appl. No. 13/312,858, 25 pages.
Notice of Allowance dated Jan. 30, 2014 for U.S. Appl. No. 13/272,273, 29 pages.

* cited by examiner

FEMTOCELL MEASUREMENTS FOR MERGER INTEGRATION PLANNING

TECHNICAL FIELD

The subject disclosure relates to wireless communications and, more particularly, to a mechanism that employs network listen and access attempt measurements collected at a femtocell to facilitate identification and/or prioritization of communication sites that can be utilized to improve indoor coverage.

BACKGROUND

Wireless service providers are observing an exponential growth in mobile communications due to both an increase in consumer demand and commercial requirements. Moreover, to ensure customer satisfaction, wireless service providers aim to deliver a high quality service at any location to facilitate reliable and efficient mobile communications. To improve wireless coverage and reduce dead zones, wireless service providers can typically add and/or replace front-end equipment to realize effective bandwidth increases. In addition, femtocells-building-based wireless access points interfaced with a wired broadband network, can be deployed to improve indoor wireless coverage, and to offload a mobility radio access network (RAN) operated by the wireless service provider. Improved indoor coverage includes stronger signal and improved reception (e.g., voice, sound, or data), ease of session or call initiation, and session or call retention as well.

Conventional systems utilize radio frequency (RF) propagation tools to predict and select the best possible sites to be added to existing wireless communication networks for improving network coverage. The adequacy of the results depends on RF propagation predictions, which have limited accuracy, especially in dense urban and indoor environments. In addition, the conventional process does not utilize actual usage data and is simply based on predicted data values. Moreover, an error in selecting and/or predicting a cell site that adds coverage value for a wireless service provider can lead to a hasty or uneducated business decision, which in turn can result in a large financial loss and dissatisfied subscribers.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate identifying and prioritizing cell sites, which can be acquired to improve existing macro coverage, based on femto network listen and access attempt measurements. In particular, a femto access point (FAP) can detect poor macro network coverage at the FAP and report physical cell identities (PCIs) of one or more cell sites that provide better radio coverage than the macro network coverage of the existing communication network. Further, the FAP can monitor a volume of attach attempts made by user equipment (UE) to connect with the FAP. In one aspect, the volume of attach attempts is utilized to localize, predict and weight the potential wireless data traffic within and between homes and/or venues at which the FAP is deployed. Specifically, an analysis component can utilize this femto measurement data to identify cell sites (e.g., of a disparate communication network) that can provide a maximum or optimum improvement in the macro network coverage, if acquired and operated. Moreover, the analysis component can quantify a number of cell sites in a target network that can be added to the existing communication and/or a number of cell sites in the target network that can be discontinued/removed, such that the macro network coverage is improved where needed most by subscribers.

Another aspect of the disclosed subject matter relates to a flexible and effective method that can be employed to facilitate merger integration planning based on data collected by FAPs. The method includes adding a frequency of an acquisition network to a femto listen lists of FAPs in an existing communication network and comparing a signal strength of a radio access network (RAN) of the acquisition network with a signal strength of a RAN of the existing communication network, at the various FAPs. Further, the method includes counting the number of FAPs that report a better signal strength for the acquisition network RAN as compared to the existing communication network RAN and weighting the cell sites of the acquisition network based on actual UE traffic data within the cell sites. Typically, the UE traffic data can be determined according to a number of access attempts made to a FAP. Additionally, the method includes sorting the cell sites based on their weights and determining which of the cell sites can be operated to provide maximum and/or optimum merger and acquisition value.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
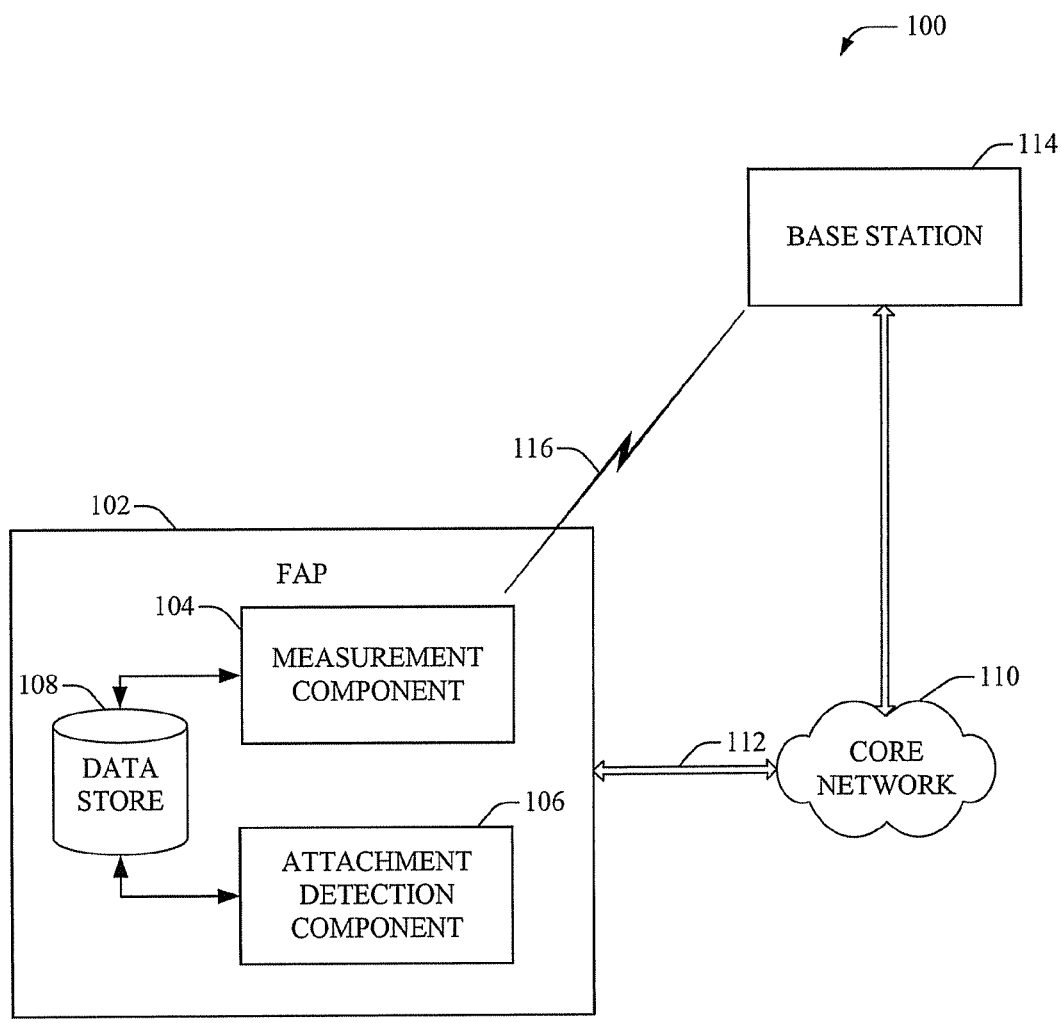
FIG. 1 illustrates an example system that facilitates identification of communication sites that can improve indoor coverage.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" and "exemplary" are used herein to mean serving as an instance, or illustration. Any aspect or design described herein as "example" or "exemplary" is not necessarily to be construed as preferred or advantageous over other aspects or designs. Rather, use of the word example or exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms the terms "femtocell", and "femto" are utilized interchangeably, while "macro cell" and "macro" are utilized interchangeably herein.

The systems and methods disclosed herein provide a means to detecting areas with poor wireless coverage and/or identifying the cell sites that, if acquired and operated, will improve indoor coverage where needed by the most number of subscribers. Conventional systems employ radio frequency (RF) propagation tools to predict and select the best possible sites to be added to existing networks. However, the predictions are often inaccurate, for example, in dense urban and indoor environments. In contrast to conventional systems, the systems and methods disclosed herein determine a number of subscribers for whom indoor coverage will improve as a result of the site addition based on actual usage data. This information can be leveraged to make merger acquisition decisions. For example, the number of sites to keep can be quantified and the incremental performance gain opportunities that result can accordingly be predicted.

Aspects, features, or advantages of the subject innovation can be exploited in substantially any wireless communication technology; e.g., Wi-Fi, Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates identification of communication sites that can improve indoor coverage, according to an aspect of the subject innovation. The term "site" utilized herein refers to a cell site, for example, a location at which antennas (e.g., transmitter/receivers transceivers) and electronic communications equipment are placed. As an example, a cell site can typically include communications equipment to create a cell in a cellular network. The communications equipment can include an access point, a base station, a Node B, an evolved Node B, a home Node B (HNB), or the like. In one aspect, system 100 employs network listen and access attempt measurements from a femto access point (FAP) 102 to detect areas with weak radio coverage, and identify and/or prioritize sites that can be acquired to improve the weak radio coverage.

Typically, the system 100 includes a wireless communication network (e.g., cellular macro network) served by a base station 114. Moreover, base station 114 provides macro coverage that is generally intended for servicing wireless mobile devices. To improve indoor wireless coverage, and/or to offload the mobility radio access network (RAN), femtocells, such as, a femtocell, served by a FAP 102, can be deployed within system 100. It can be appreciated that services provided by the femtocell can be extended beyond indoor coverage enhancement; for example, the femtocell can be utilized in areas wherein macro coverage is not poor or weak. Typically, the femtocell can cover an area that can be determined, at least in part, by transmission power allocated to FAP 102, path loss, shadowing, and so forth. The FAP 102 facilitates communication between authorized user equipment (UE) within a femtocell coverage area and a service provider's core network 110. In particular, the communication (e.g., voice and/or data traffic) between the FAP 102 and the core network 110 is routed through a backhaul broadband wired network 112. The broadband network can include an optical fiber backbone, twisted-pair line, T1/E1 phone line, DSL, coaxial cable, and/or the like.

In one aspect, FAP 102 can include a measurement component 104 that can perform a "network listen" procedure to monitor and/or measure the surrounding radio environment. As an example, the network listen measurements can be employed to dynamically adjust various parameters associated with the FAP 102 to deliver the most reliable service possible, even as the surrounding radio environment changes. For example, these measurements can be utilized to select parameters, such as, but not limited to, power, frequencies, neighbor cells for handover, etc. In one aspect, the measurement component 104 can determine whether the macro coverage at the location of the femtocell is weak or poor. For example, the measurement component 104 can determine strength of signal(s) 116 received from the base station 114 and compare the received signal strength with a predefined threshold value. Moreover, if the received signal strength falls below the predefined threshold, poor/weak macro coverage can be identified at the femtocell location. Typically, the location of the FAP 102 is known at the time of activation, for example, based on global positioning system (GPS) co-ordinates or user input.

In another aspect, the measurement component 104 can also compare the macro coverage for the service provider with signal strengths from cell sites (shown infra with respect to FIG. 5) operated by disparate service providers; for example, the cell sites of an operator being considered for acquisition or merger by the service provider. This information can be used to identify which of the cell sites within the communication network of the disparate service providers can add coverage value and which cell sites do not add coverage value (e.g., provide redundancy). Further, traffic at the femtocell location can be determined by an attachment detection component 106. Moreover, the attachment detection component 106 can identify attachment attempts made by user equipment (UE) within the femtocell to connect to the FAP 102. The volume of attachment attempts (e.g., for a specific time period, such as but not limited to, within a day, a week, a month, etc.) can be used to localize, predict, and weight the potential wireless data traffic within and between homes and/or venues at which the FAP 102 is deployed. In one embodiment, the measurement data collected by the measurement component 104 and/or the attachment data collected by the attachment detection component 106 can be stored within data store 108. Although data store 108 is depicted to reside within the FAP 102, it can be appreciated that the data store 108 can be locally or remotely coupled to FAP 102. Further, although only one base station 114 is illustrated in FIG. 1, it can be appreciated that the measurement component 104 can detect signal strengths from multiple base stations. As an example, the measurement component 104 can detect poor macro coverage based on an average of the received signal strengths, the lowest received signal strength, the highest received signal strength, and/or the like.

Figure 2:
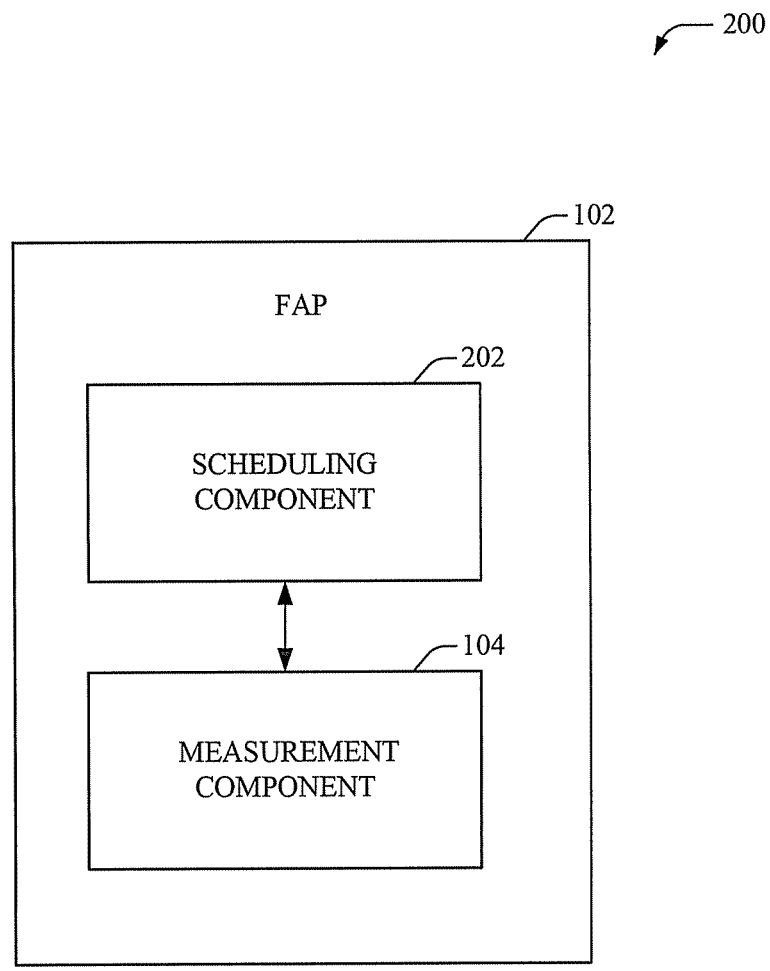
FIG. 2 illustrates an example system that can be employed for scheduling network listen measurements in a femtocell.

Referring to FIG. 2, there illustrated is an example system 200 that can be employed for scheduling network listen measurements in a femtocell in accordance with an aspect of the subject disclosure. Typically, a measurement component 104 can reside within a FAP 102, and/or be operatively connected to the FAP 102. It can be appreciated that the FAP 102 and the measurement component 104 can include functionality, as more fully described herein, for example, with regard to system 100. As discussed supra, the FAP 102 is connected to the mobile core network through a broadband network (112 in FIG. 1).

Typically, the measurement component 104 can monitor a radio environment surrounding the FAP 102. According to an embodiment, the measurement component 104 can categorize the macro coverage as "poor"/"weak" or "sufficient"/"reliable", by detecting various signal parameters. For example, the measurement component 104 can detect signal strength(s) of signal(s) received from surrounding base station(s). Moreover, the measurement component 104 can analyze the signal strength(s), for example, by comparing the signal strength(s) to a predefined threshold value. If the signal strength(s) is less than the predefined threshold value, poor macro coverage can be detected at the location of the femtocell. Alternatively, if the signal strength(s) is greater than the predefined threshold value, sufficient and/or reliable macro coverage can be detected at the location of the femtocell. As an example, the predefined threshold value can specify minimum requirements, such as, but not limited to, signal strength, uplink and/or downlink rate, etc., below which communication would be unsatisfactory (e.g., poor call quality, slow downloads, and/or dropped calls) to a customer. In addition, the measurement component 104 can also compute average signal strength based on data from multiple network listen procedures and/or generate most any statistical data to identify poor/weak macro coverage.

In another embodiment, the signal parameters (e.g., signal strengths) can be compared with signal parameters (e.g., signal strengths) of signals transmitted by base stations in a different communication network operated by a different service provider. Typically, frequencies (e.g., 1900 broadcast control channel (BCCH) or 1900 Pilot frequencies) associated with the different communication network can be added to a femto network listen list (e.g., stored in data store 108). As an example, the measurement component 104 can measure the frequency, for example, 1900 BCCH frequency (for GSM) or 1900 Pilot frequency (for UMTS), during a network listen procedure and compare the 1900 BCCH/Pilot level of the different communication network to that of the 1900 BCCH/Pilot level associated with the communication network of the femtocell service provider.

In one aspect, the FAP 102 can further include a scheduling component 202 that can determine when the network listen procedure can be initiated. In one example, the scheduling component 202 can schedule the network listen on or during FAP 102 activation. Moreover, each time the FAP 102 is powered up, the scheduling component 202 can trigger initiation of the network listen procedure (e.g., by the measurement component 104). Further, the scheduling component 202 can also determine the frequency at which the network listen measurements can be obtained and/or a time/date/day to perform the network listen procedure. The radio conditions surrounding the femtocell can vary based on several factors, and accordingly to achieve accurate measurements the scheduling component 202 can schedule the network listen procedure at different times. Typically, the scheduling component 202 can also determine a time when the FAP 102 is not busy (or is idle) and schedule a network listen procedure at that time (e.g., every night). Moreover, the scheduling component 202 can facilitate scheduling of network listen measurements on activation of the FAP 102, at a specific time, periodically (e.g., at 12:00 PM, daily, monthly, etc.), on demand (e.g., by the service provider), based on a predefined policy, based on an event, and/or most any other time. The measurement component 104 can initiate and/or perform the network listen procedure and obtain measurements (e.g. signal strengths) for frequencies specified in the femto network listen list.

Figure 3:
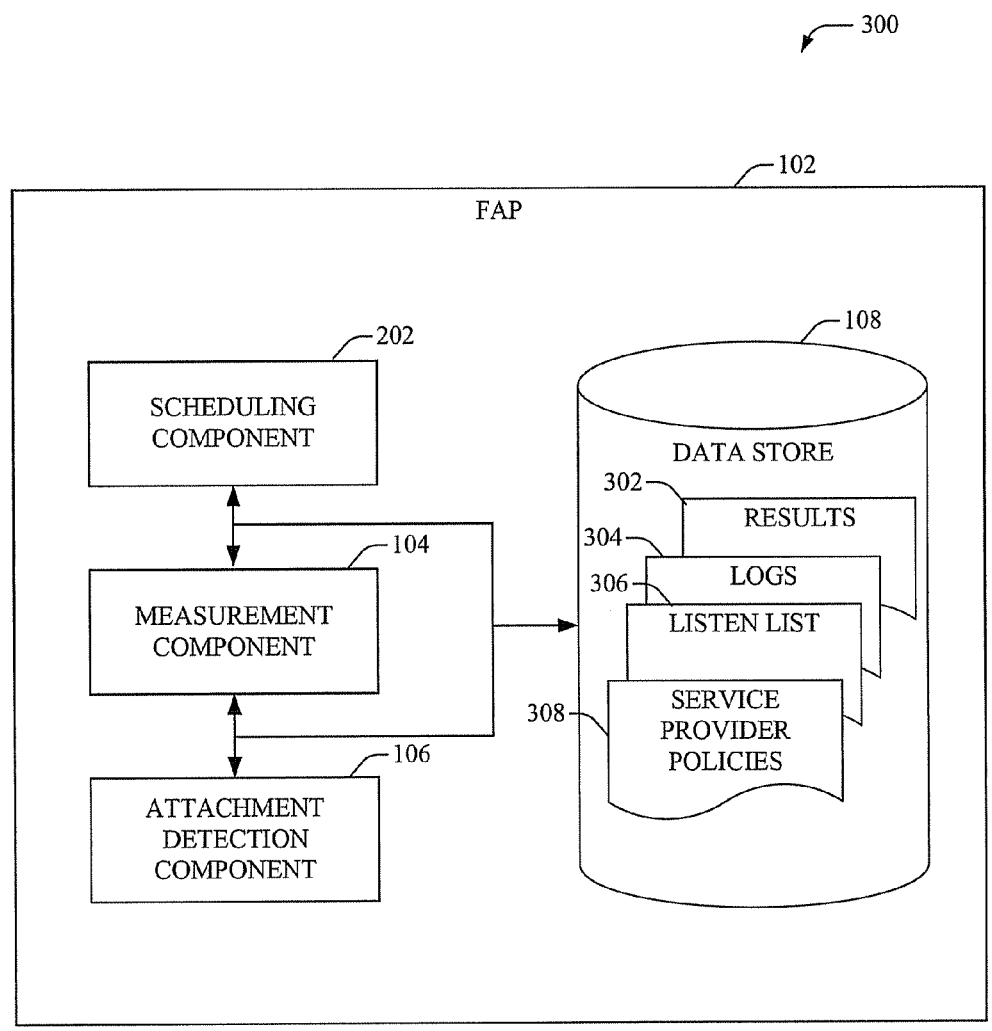
FIG. 3 illustrates an example system that leverages measurements obtained by a femto access point (FAP) to facilitate network expansion decisions.

Referring now to FIG. 3, there illustrated is an example system 300 that leverages measurements obtained by a FAP 102 to facilitate network expansion decisions. In particular, the FAP 102 can measure (i) BCCH/Pilot frequency(ies) via the measurement component 104 and (ii) UE traffic via the attachment detection component 106. Moreover, the measured information can provide much needed intelligence for merger planners looking to identify and deliver the maximum opportunity and return for acquisition targets.

According to an aspect, the FAP 102 can include (or be externally coupled to) a data store 108. The data store 108 can store information, such as, but not limited to, measurement results 302, logs 304, a listen list 306, service provider policies 308, etc. Typically, the listen list 306 can include frequencies that are utilized by the measurement component 104 during the network listen procedure. Moreover, the listen list 306 and/or the service provider policies 308 can be specified by a service provider during provisioning, and/or updated periodically and/or on demand (e.g., via the broadband network 112), by the service provider. It can be appreciated that the data store 108 can be most any type of database, and, can be local to the FAP 102, remotely connected to the FAP 102, or distributed. As an example, the scheduling component 202 can utilize information stored in the data store 108 (e.g., service provider policies 308) to identify a time to schedule the network listen procedure. Further, the measurement component 104 can perform the network listen procedure (e.g., in the background), at the scheduled time and can store the received/measured data in the results 302. Additionally or optionally, the measurement component 104 can store data associated with the network listen procedure, for example, time/date of measurement were performed, alarms, errors, etc. in the logs 304. Further, the attachment detection component 106 can determine a number of attachment attempts made by UEs (e.g., white listed and/or non-whitelisted UEs) for camping on to the FAP 102. In one example, the attachment detection component 106 can also identify a number of attachment attempts made by unique UEs based on an identifier, such as, but not limited to an International Mobile Subscriber Identity (IMSI), an International Mobile Equipment Identity (IMEI), a Mobile Station International Subscriber Directory Number (MSISDN), or a serial number.

It can be appreciated that the database 108 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 4:
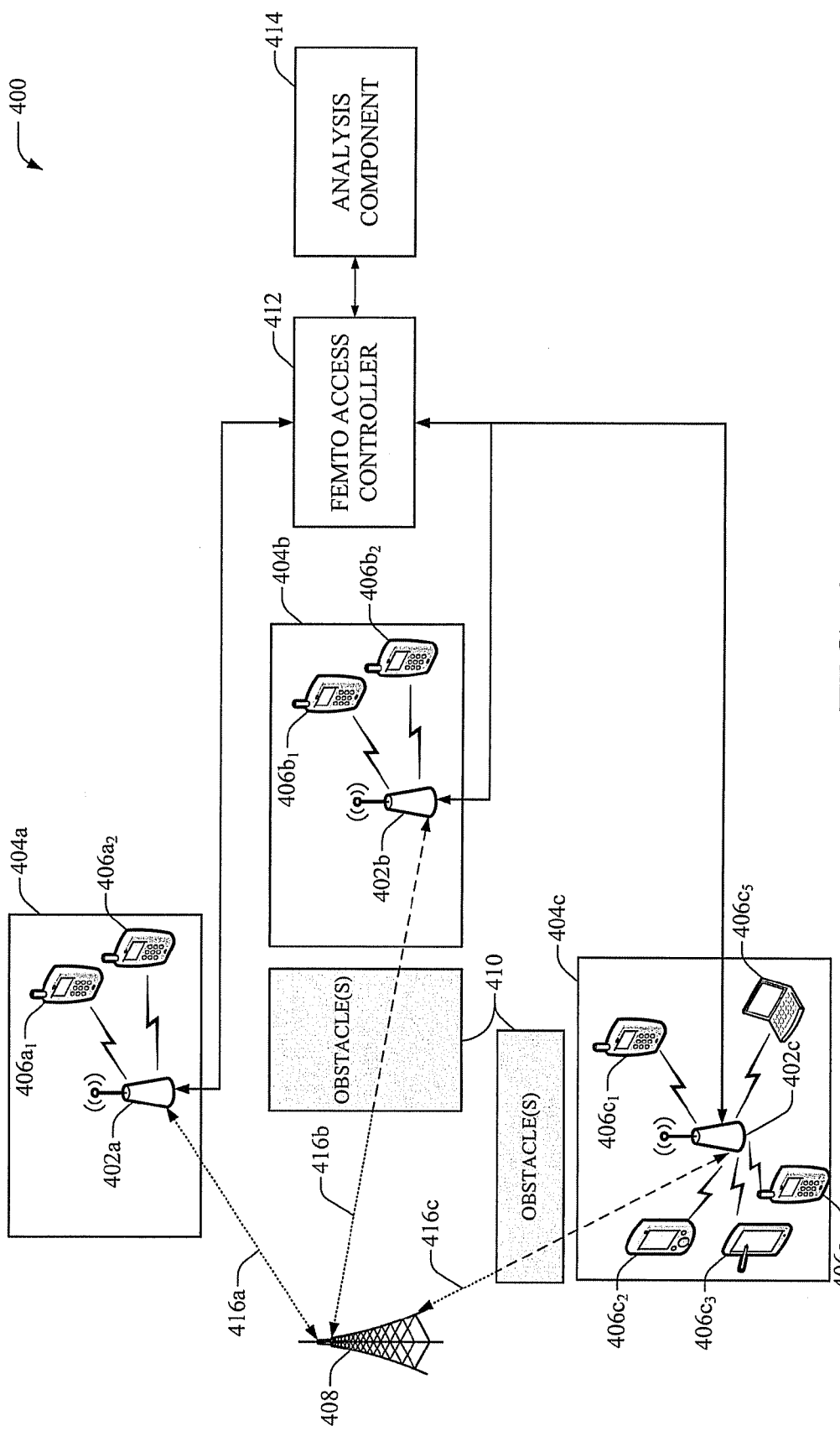
FIG. 4 illustrates an example system that employs femtocell measurements to detect areas with poor macro coverage.

FIG. 4 illustrates an example system 400 that employs femtocell measurements to detect areas with poor macro coverage, according to an aspect of the subject innovation. Typically, one or more femtocells 404a-404c can be deployed within a macro network, served by a base station 408. Although three femtocells 404a-404c served by their respective FAPs 402a-402c are illustrated, it can be appreciated that the subject disclosure is not that limited and most any number of femtocells can be deployed within the network. Moreover, the FAPs 402a-402c can be substantially similar to FAP 102 and can include functionality, as more fully described herein, for example, with regard to systems 100-300.

Typically, at a scheduled time or during an idle period, FAPs 402a-402c can monitor their surrounding radio conditions (e.g., by employing respective measurement components). In one example, FAPs 402a-402c can be configured to provide alerts and/or warnings, to the femto access controller 412 only if the signal strength of a signal transmitted by the base station 408 is below a specified threshold value. In another example, the FAPs 402a-402c can be configured to provide the received measurements to the femto access controller 412, each time the network listen procedure is performed. In yet another aspect, the FAPs 402a-402c can aggregate test results from multiple network listen procedures performed over time. For example, FAP 402a can detect a strong or sufficient macro signal 416a from a nearby base station 408; while FAPs 402b and 402c can detect comparatively weaker macro signals (416b and 416c respectively) due to presence of obstacles 410, such as but not limited to buildings, hills, monuments, etc.

In addition, FAPs 402a-402c can track the number of attachment attempts received from UEs, for example, authorized and/or unauthorized to connect to the FAP (e.g., by employing the attachment detection component 106), over a specified time period (e.g., daily, in a week, monthly, etc.). In one aspect, the number of attachment attempts over different periods of time can be aggregated and/or averaged and delivered to the femto access controller 412. For example, FAPs 402a and 402b can detect low traffic areas with a lower number of attachment attempts from UEs $406a_{1-2}$ and $406b_{1-}$ 2; while FAP 402c can detect a much larger number of attachment attempts by UEs 406$c_{1-5}$. It can be appreciated that the UEs (406$a_{1-2}$, 406$b_{1-2}$, and 406$c1_{-5}$) disclosed herein can include most any communication device, such as, but not limited to, a cell phone, a tablet, a digital media player, a gaming console, a digital camera, a video recorder, a personal digital assistant (PDA), a personal computer, laptop, etc. As an example, the UEs (406$a_{1-2}$, 406$b_{1-2}$, and 406$c_{1-5}$) can be mobile (e.g. cell phone), have limited mobility (e.g. a desktop computer) and/or be stationary (e.g. LTE-based home device/appliance). In one aspect, the FAPs 402a-402c can transfer data (e.g., measurement and/or attachment data) to the femto access controller 412 at a specific time, for example, when the femtocell is idle, periodically, on demand (e.g., polling), etc. The femto access controller 412 can collect, aggregate and/or consolidate reports (e.g., including measurement and/or attachment data) from multiple FAPs (e.g., FAPs 402a-402c) that typically are neighboring to the same macro sector. Further, the femto access controller 412 can forward the reports to an analysis component 414 for further processing.

The analysis component 414 can identify a location or area at which macro coverage is poor/insufficient based on an analysis of the reports. Moreover, the analysis component 414 can determine locations of the FAPs, for example, FAPs 404b and 404c, which report poor/insufficient signal parameters associated with signals received from the base station 408. Typically, locations of femtocells can be known to the service provider, can be requested from a user (e.g., physical address), and/or can be determined based on data from a GPS system (e.g., GPS co-ordinates). Further, the analysis component 414 can weigh the FAPs observing poor/insufficient macro coverage, based on the number of access attempts to the respective FAPs and sort, prioritize, and/or rank FAPs according to their weighting. In the example depicted in system 400, although both FAP 406b and FAP 406c report poor macro coverage, FAP 406c can be assigned a higher weight than FAP 406b, since the number of attachment attempts requested by UEs at FAP 406c is higher than the number of attachment attempts recorded at FAP 406b. Moreover, the analysis component 414 can perform a cost-benefit analysis to generate a ranked list of FAPs, which can be utilized by the service provider to detect areas with poor macro coverage that have the highest amount of traffic and/or highest concentration of users. Improvements made to macro coverage in these areas can benefit the highest concentrations of users and lead to greatest amount of customer satisfaction.

Figure 5:
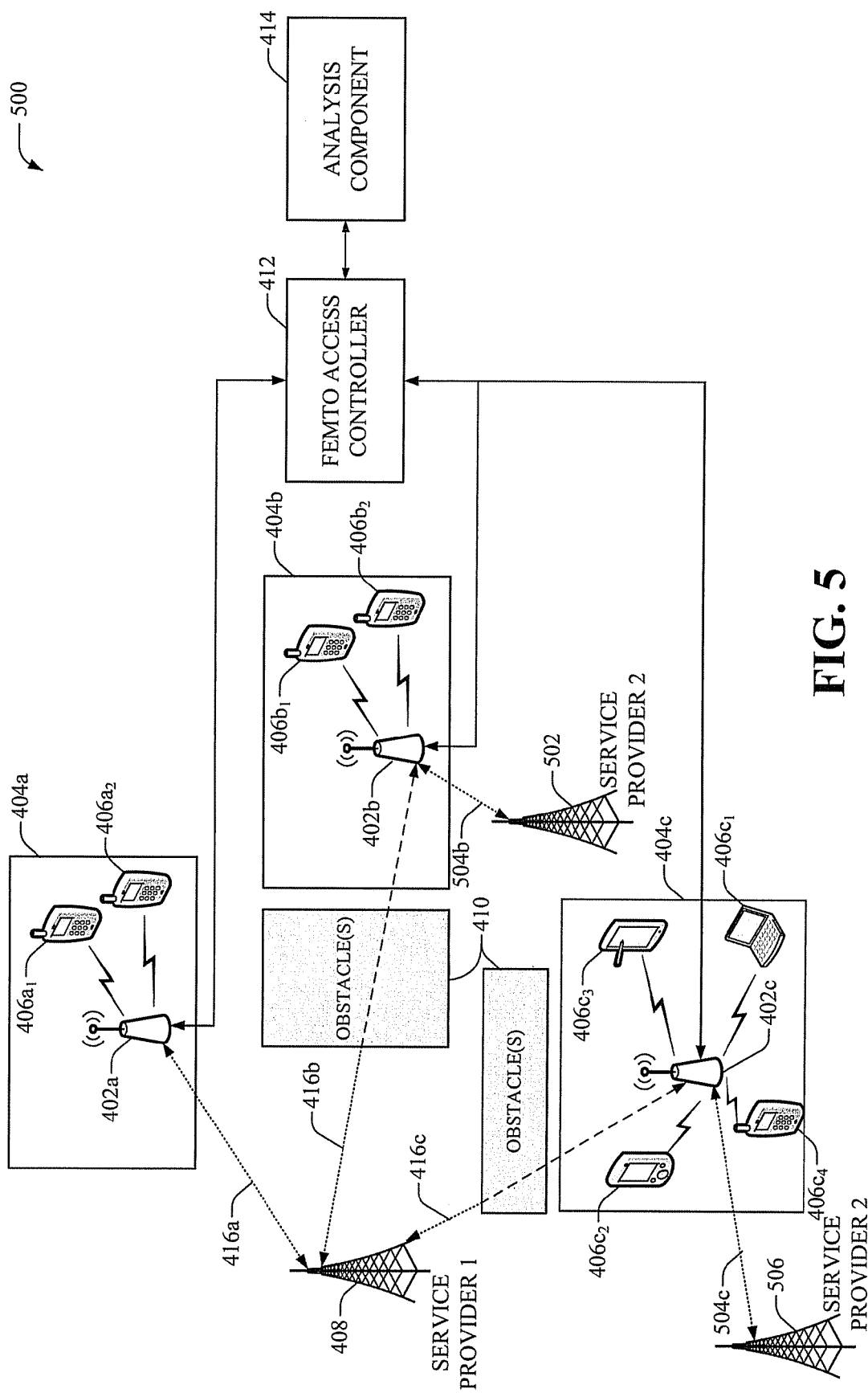
FIG. 5 illustrates an example system that utilizes femto measurements to facilitate merger integration planning.

FIG. 5 illustrates an example system 500 that utilizes femto measurements to facilitate merger integration planning System 500 includes a communication network operated by a first service provider (e.g., service provider 1) that comprises a plurality of macro and femtocells. Specifically, system 500 provides merger planners with relevant data that can facilitate in making informed and educated decisions during acquisition and/or merger integration. Moreover, the FAPs 402a-402c, femtocells 404a-404-c, base station 408, femto access controller 412, and analysis component 414, can include functionality, as more fully described above, for example, with regard to system 400.

In this example scenario, frequencies (e.g., 1900 BCCH or 1900 Pilot frequencies) associated with a disparate communication network, for example, an acquisition target network, operated by a second service provider (e.g., service provider 2) are added to the femto network listen lists of FAPs 402a-402c. According to an embodiment, during a network listen procedure, the FAPs 402a-402c can detect (e.g., via respective measurement components 104) signal strengths (416a-416c) received from a base station 408 associated with the first service provider and signal strengths (504b-504c) received from a base stations (502, 506) associated with the second service provider. For example, FAPs 402a-402c can measure the 1900 BCCH/Pilot frequency of acquiring network and a foundation macro network. Moreover, the FAPs 402a-402c can compare the 1900 BCCH/Pilot level of the acquisition target network (operated by the second service provider), if detected, to a macro level of the foundation macro network (operated by the first service provider). In one aspect, the FAPs 402a-402c can deliver the measured data to the femto access controller 412, which in turn can forward the data to the analysis component 414 for comparison and further processing. Alternatively, the FAPs 402a-402c can transmit the measured data only if the 1900 BCCH/Pilot level of the acquisition target network is greater than the macro level of the foundation macro network. For example, in system 500, FAP 402a detects a strong signal from the base station 408, while FAP 402b and 402c detect comparatively weaker signals (due to obstacles 410) from the base station 408. Moreover, FAP 402b and 402c can detect a stronger signals (504b, 504c) from base stations 502 and 506 respectively, operated by the second service provider, compared to the signals (416b, 416c) from base station 408, during the network listen procedure. In addition, FAPs 402a-402c can monitor attachment attempts received from UEs, for example, authorized and/or unauthorized to connect to the FAP (e.g., by employing respective attachment detection component 106), over a specified time period (e.g., daily, in a week, monthly, etc.). For example, FAPs 402a and 402b can detect a low volume of attachment attempts from UEs 406$a_{1-2}$ and 406$b_{1-2}$; while FAP 402c can detect a higher volume of attachment attempts by UEs 406$c_{1-5}$. The FAPs 402a-402c can transmit (e.g., over a backhaul broadband network) data relating to network listen measurements, comparison results, and/or attachment attempts to the femto access controller 412.

The femto access controller 412 can aggregate, consolidate, group (e.g., based on location of FAPs 402a-402c), and/or filter data received from the FAPs 402a-402c and forward the resulting data to the analysis component 414. The analysis component 414 identifies the FAPs (e.g., 402b-402c) that report stronger signals (504b, 504c) from the base stations (502, 506), operated by the second service provider, compared to the signals (416b, 416c) from base station 408. Moreover, the FAPs (e.g., 402b-402c) can include a Physical Cell Identity (PCI) associated with the base station (502, 506) in the data transferred to the femto access controller 412. The analysis component 414 identifies a list PCIs of base stations, operated by the second service provider (e.g., received from multiple femto access controllers) and weights the PCIs according to the number of attach attempts to each FAP (e.g., 402b-402c). Typically, PCIs reported by FAPs with more attach attempts shall have more result weighting contribution than PCIs reported by FAPs with less attach attempts. For example, the PCI associated with base station 506 can be assigned a higher weight than the PCI associated with base station 502. Moreover, the weighting can benefit the highest concentrations of users to determine the prospective customer improvement.

According to an embodiment, the analysis component 414 can sort the PCI list according to the number of FAPs, which report a better wireless coverage from the PCI than the macro network coverage and the total attachment requests received at those FAPs. Moreover, the sorted PCI list can be utilized by the first service provider to identify merger/acquisition opportunity and value (e.g., quantify how much better the macro coverage will be and/or how many subscribers will benefit, if these sites (502, 506) are added to communication network of the first service provider). Accordingly, data received from the FAPs can be utilized by an operator and/or an automatic cell planning tool to improve macro network coverage.

Figure 6:
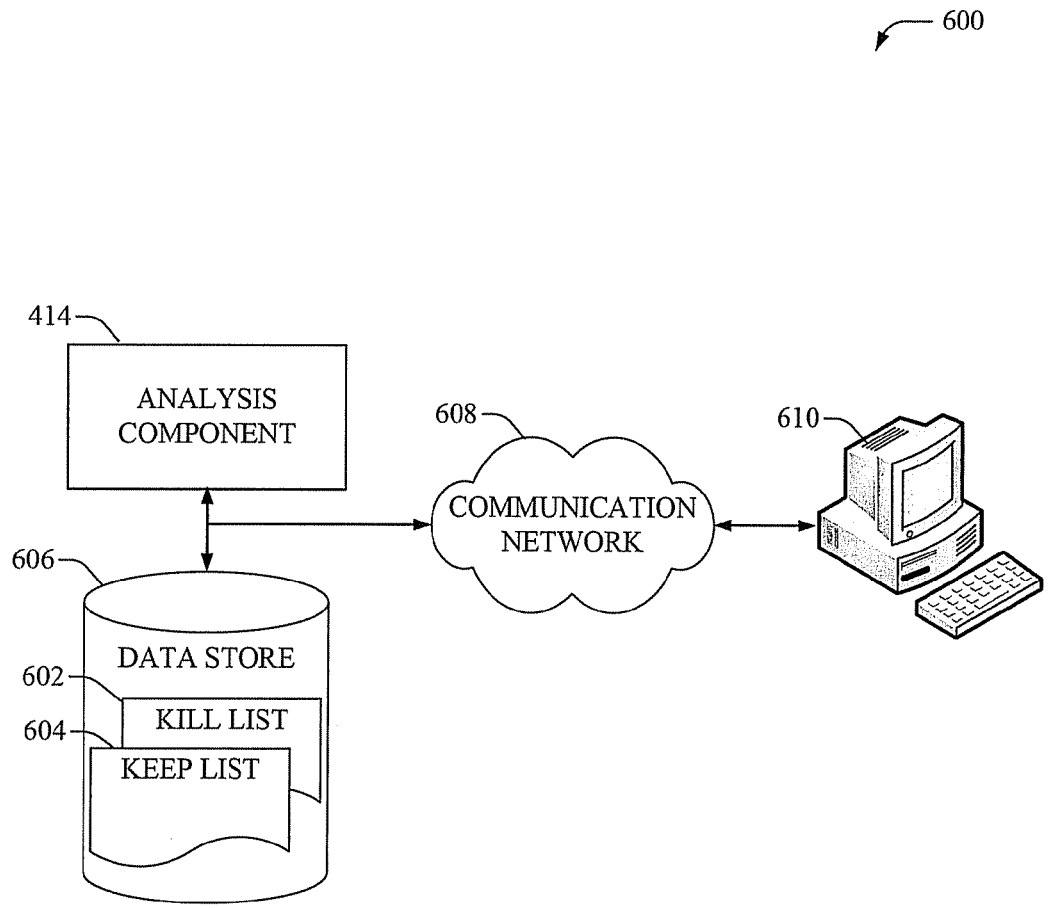
FIG. 6 illustrates an example system that can be utilized for integration planning during merger or acquisition of disparate communication networks.

FIG. 6 illustrates an example system 600 that can be utilized for integration planning during merger of disparate communication networks. Typically, analysis component 414 can receive data including signal measurements, macro coverage data, PCI information, and/or femto attachment attempt count, etc. from FAPs deployed within a first communication network. Typically, the acquired cell sites can be identified by their respective PCIs. The analysis component 414 can prioritize and/or rank cell sites of the acquired communication network based on a cost-benefit analysis (e.g., cost of adding/operating the cell site vs. the number of subscribers that would benefit from the improved coverage) discussed in detail supra. Moreover, the analysis component 414 can utilize the priorities/ranks of the acquired cell sites to generate and/or sort a keep list 602 and/or a kill list 604, stored in data store 606. In one example, data store 606 can be most any network data store residing within or communicatively coupled to the core mobile network. Moreover, a keep list 602 can store a list of acquired cell sites that can be operated (after acquisition) to improve the existing communication network; whereas a kill list 604 can store a list of acquired cell sited that can be deactivated, discontinued or disabled (after acquisition). Typically, the list of acquired cell sites in the keep list 602 can provide optimum coverage value, if added to the existing communication network. In one aspect, the analysis component 414 can automatically and/or dynamically update the keep list 602 and/or the kill list 604 based on actual measurement and usage/traffic data.

According to an embodiment, an operator can access the keep list 602 and/or the kill list 604 over most any communication network 608 via a human machine interface, for example device 610. Typically, the communication network 608 can include a wireless or wired network, such as, but is not limited to, the Internet, a cellular network, a local area network, a Bluetooth® network, a WiFi network etc. As an example, the operator can view, edit, and/or manage the keep list 602 and/or the kill list 604 via device 610. In one example, the operator can utilize information provided by the keep list 602 and/or the kill list 604 in conjunction with, or to confirm, results predicted by legacy RF propagation tools.

Figure 7:
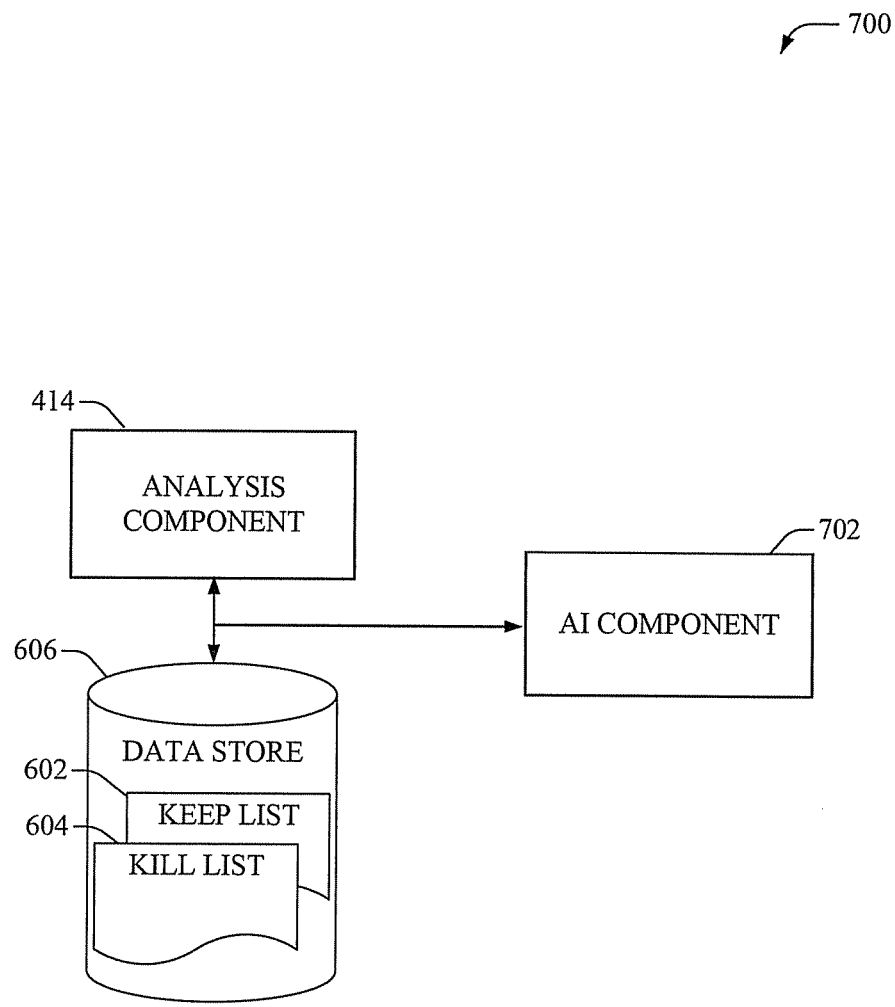
FIG. 7 illustrates an example system that facilitates automating one or more features in accordance with the subject innovation.

Referring now to FIG. 7, there illustrated is an example system 700 that employs an artificial intelligence (AI) component 702, which facilitates automating one or more features in accordance with the subject innovation. It can be appreciated that the analysis component 414, data store 606, keep list 602, and kill list 604 can include respective functionality, as more fully described herein, for example, with regard to systems 400-600.

The subject innovation (e.g., in connection with automatically identifying acquired cell sites that provide a maximum value/benefit after addition to an existing communication network) can employ various AI-based schemes for carrying out various aspects thereof. For example, a process for determining which cell sites to add in the keep list 602, which cell sites to add in the kill list 604, etc., can be facilitated via an automatic classifier system and process. Moreover, the classifier can be employed to determine a ranking or priority of the each cell site of the acquired network. A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information stored in data store 606, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing UE behavior, operator preferences, historical information, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc. The criteria can include, but is not limited to, historical patterns, UE behavior, user preferences, service provider preferences and/or policies, FAP parameters, location of the femtocell, location of the acquired sites, etc.

Figure 8:
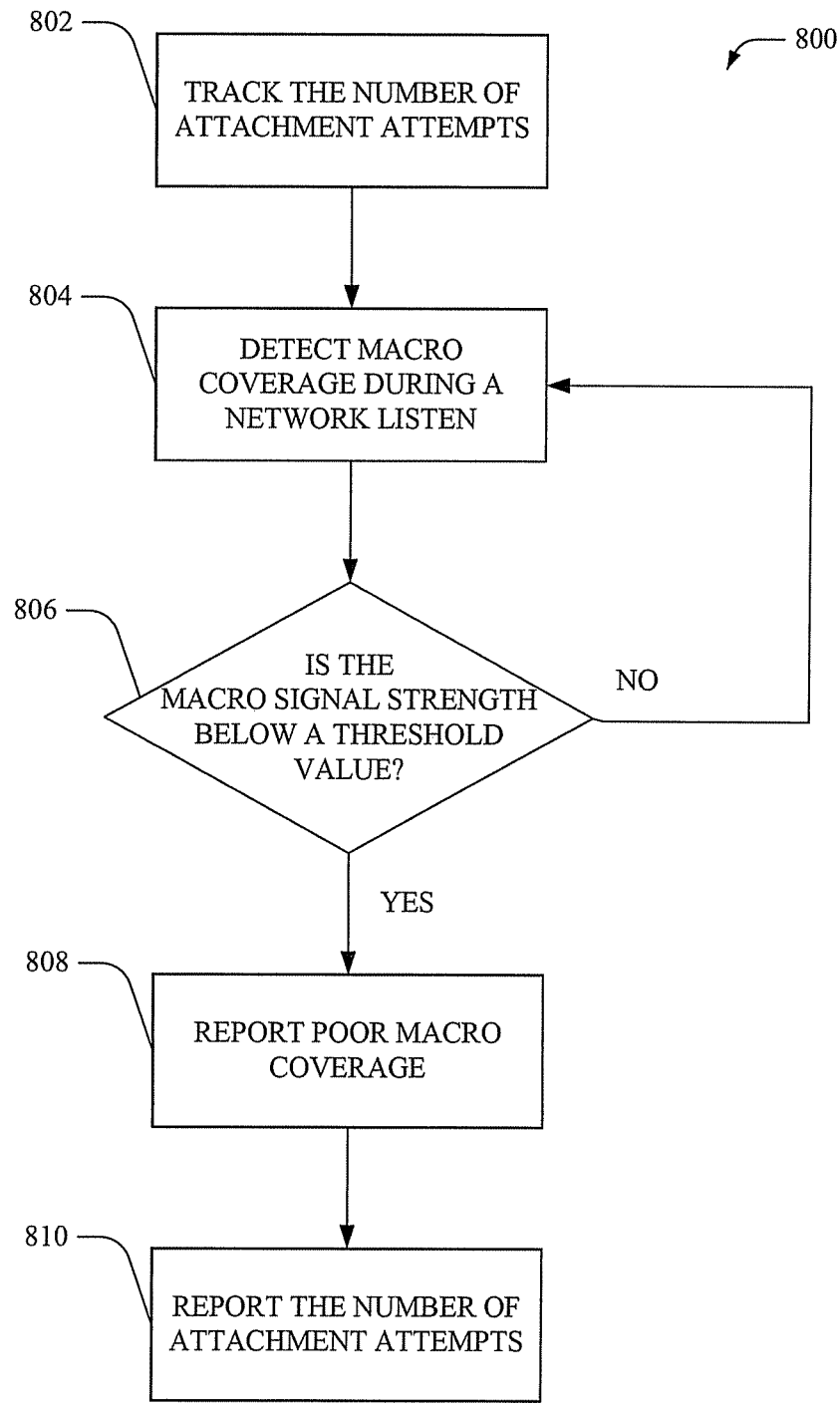
FIG. 8 illustrates an example methodology that that can be utilized to facilitate detection of locations with poor macro network coverage.
Figure 9:
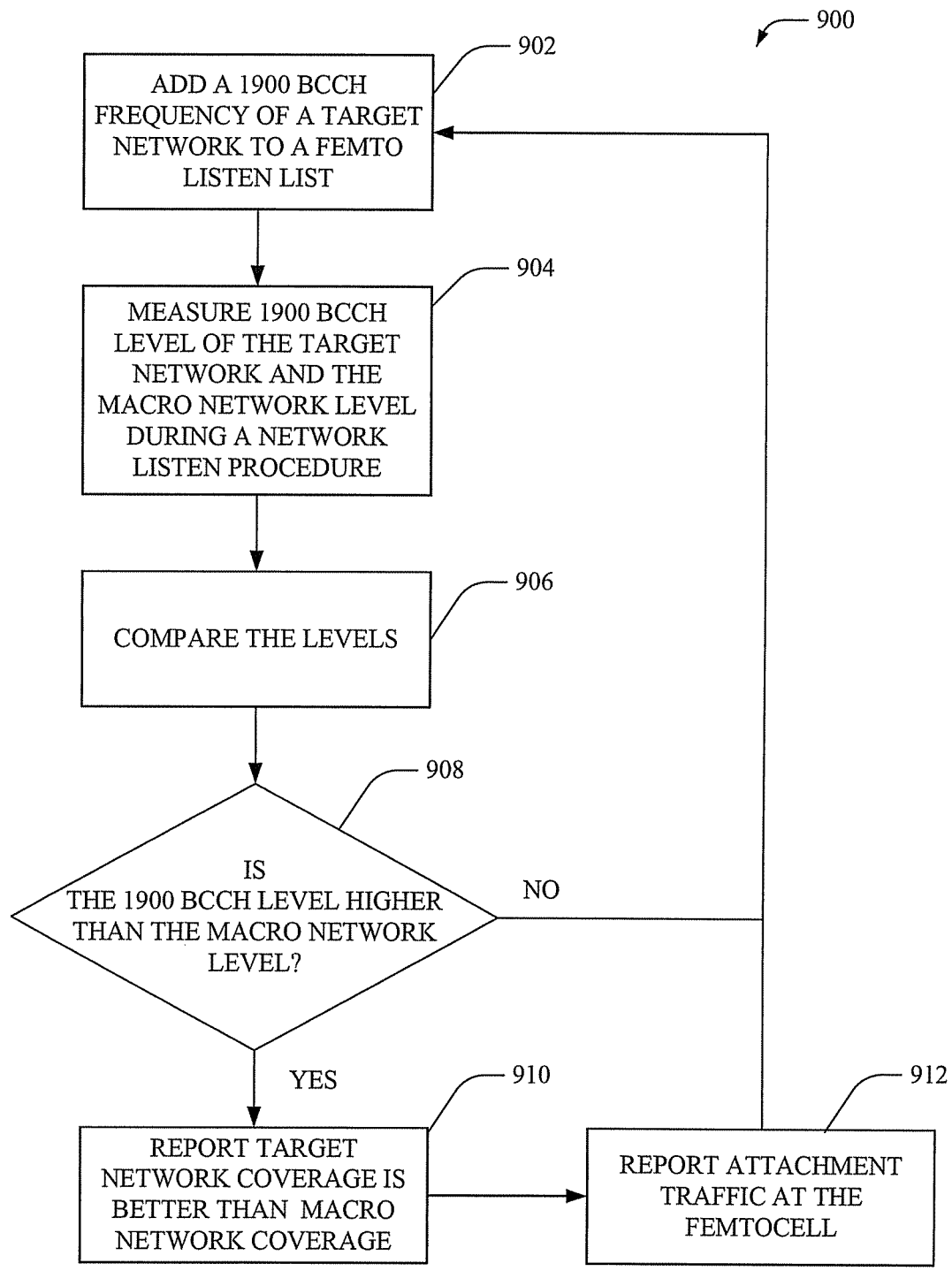
FIG. 9 illustrates an example methodology that provides femto measurements that are employed for network integration planning.
Figure 10:
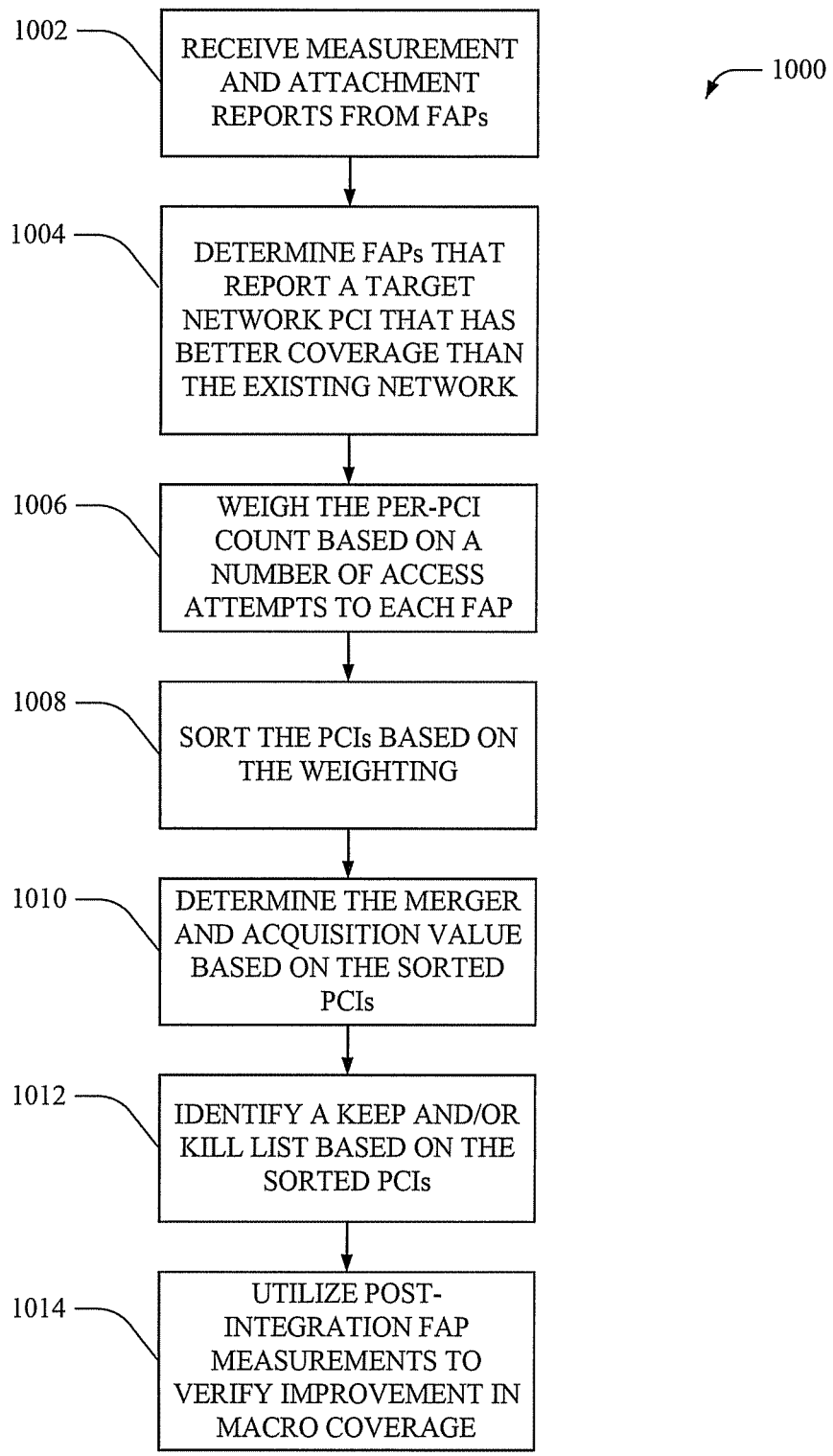
FIG. 10 illustrates an example methodology that facilitates employing femto measurement data to identify a maximum/optimum opportunity and return for acquisition targets.

FIGS. 8-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 8, illustrated is an example methodology 800 that can be utilized to facilitate detection of locations with poor macro network coverage, according to an aspect of the subject specification. A large number of FAPs are being deployed in the cellular network to improve indoor coverage and offload a mobility RAN. Generally, the location of each FAP is known at the time of activation and/or installation. The FAP utilizes a network listen procedure to measure the surrounding radio environment, which can be employed to adjust parameters associated with the FAP.

Methodology 800 leverages the network listen procedure to identify locations where the macro coverage is poor, weak or insufficient for reliable communication and facilitates determination of a number of users that can benefit if the macro coverage at the identified location is improved. This enables dynamic and efficient cell site planning.

In one aspect, at 802, the number of attachment attempts made by UE(s) to connect to a FAP can be tracked, for example, over a specified period of time. Additionally or optionally, the number unique devices attempting to attach to the FAP can also be identified, for example, based on an IMSI number of the device. At 804, macro coverage can be detected during a network listen procedure. Typically, signal parameters such as, but not limited to, signal strength of a transmission from a base station can be detected and compared to a threshold value. At 806, it can be determined whether the macro signal strength (or other parameter) is below the threshold value. If the macro signal strength is below the threshold value, at 808, poor macro coverage at the location of the FAP can be reported (e.g., to a femto access controller). In addition, at 810, the number of attachment attempts to the FAP within the specified amount of time can be reported (e.g., to a femto access controller). Typically, the number of attachment attempts provides a gauge for estimating a number of subscribers that will benefit if macro coverage is improved at the location of the FAP.

FIG. 9 illustrates an example methodology 900 that provides femto measurements that are employed for network integration planning in accordance with an aspect of the subject specification. In particular, methodology 900 provides data to an operator or entity to identify target cell sites that if added to the existing communication network, would provide the most value (e.g., benefit the most number of subscribers, increase operating costs by a minimum amount, etc.). At 902, a 1900 BCCH (or 1900 Pilot) frequency of the target network (e.g., acquired or to be acquired communication network) can be added to a femto listen list of a FAP. At 904, the 1900 BCCH level of the target network and the macro network level at the FAP can be measured during a network listen procedure. Moreover, at 906, the levels can be compared and at 908, it can be determined whether the 1900 BCCH level of the target network is higher than the macro network level. If the 1900 BCCH level of the target network is higher than that of the macro network, then at 910, it can be reported that the target network coverage is better than the macro network coverage of the existing network, at the FAP location. In addition, at 912, attachment traffic (e.g., a number of attachment attempts made by UEs to connect to the FAP within a specific interval) can also be reported. Typically, the reports can be processed and analyzed to facilitate integration planning.

FIG. 10 illustrates an example methodology 1000 that facilitates employing femto measurement data to identify a maximum opportunity and return for acquisition targets, according to an aspect of the subject disclosure. Moreover, methodology 1000 provides data representing actual (not predicted) indoor coverage based on femto measurements, such that an operator (or planning tool) can make informed and educated decisions to kill or keep target cell sites. For example, the methodology 1000 can provide data indicative of a cost-benefit value of keeping vs. killing an additional cell site (e.g., target/acquired cell site).

At 1002, measurement and attachment reports can be received from FAPs at various locations in the communication network. Typically, the reports can include data indicating whether a signal from a cell site of a disparate (e.g., target, acquired, to be acquired) communication network is stronger than the macro signal from a cell site of the communication network at a FAP. The reports can specify PCI of cell sites, from which a stronger signal is detected. In addition, the reports can include attachment data, for example, total number of attachment attempts made at a FAP, total number of unique UEs attempting to connect the FAP, number of attachment attempts made by white listed devices, and/or number of attachment attempts made by non-whitelisted devices, etc. At 1004, the FAPs, which report a target network PCI that can better coverage than the existing macro network coverage can be determined, for example, based on the data from the reports.

At 1006, the per-PCI count can be weighted based on the number of access attempts made to each FAP. As an example, weighting can be based on the total number of attachment attempts, number attempts made by whitelisted UEs, number of attempts made by non-whitelisted UEs, number of unique UE requesting femto access, and/or most any other parameters. Further, at 1008, the PCIs can be sorted based on the weighting, for example, in ascending or descending order of weights. Moreover, at 1010, a merger and acquisition value can be identified based on the sorted PCIs. For example, if a large number of PCIs have high weights, it can be determined that adding the cell sites associated with these PCIs to the existing communication network can significantly improve macro coverage (e.g., indoor coverage) and customer satisfaction. Accordingly, in this example scenario the merger and acquisition value can be high. Furthermore, at 1012, a keep and/or kill list can be identified based on the sorted PCIs. For example, the first N PCIs in the sorted list (e.g., with the highest weights) can be added to a keep list or the last M PCIs in the sorted list (e.g., with the lowest weights) can be added to a kill list (where N, M can be integers). In one aspect, the sorted PCIs can be employed in conjunction with RF propagation tools to populate the keep and/or kill lists. For example, the sorted PCIs can be employed to confirm or validate prediction results generated by the RF propagation tools. Typically, after acquisition, the service provider can operate (or deactivate) the target cell sites based on the keep and/or kill lists. Moreover, at 1014, post-integration measurement from the FAPs can be utilized to verify improvements in macro coverage, for example, due to the addition of the target cell sites.

Figure 11:
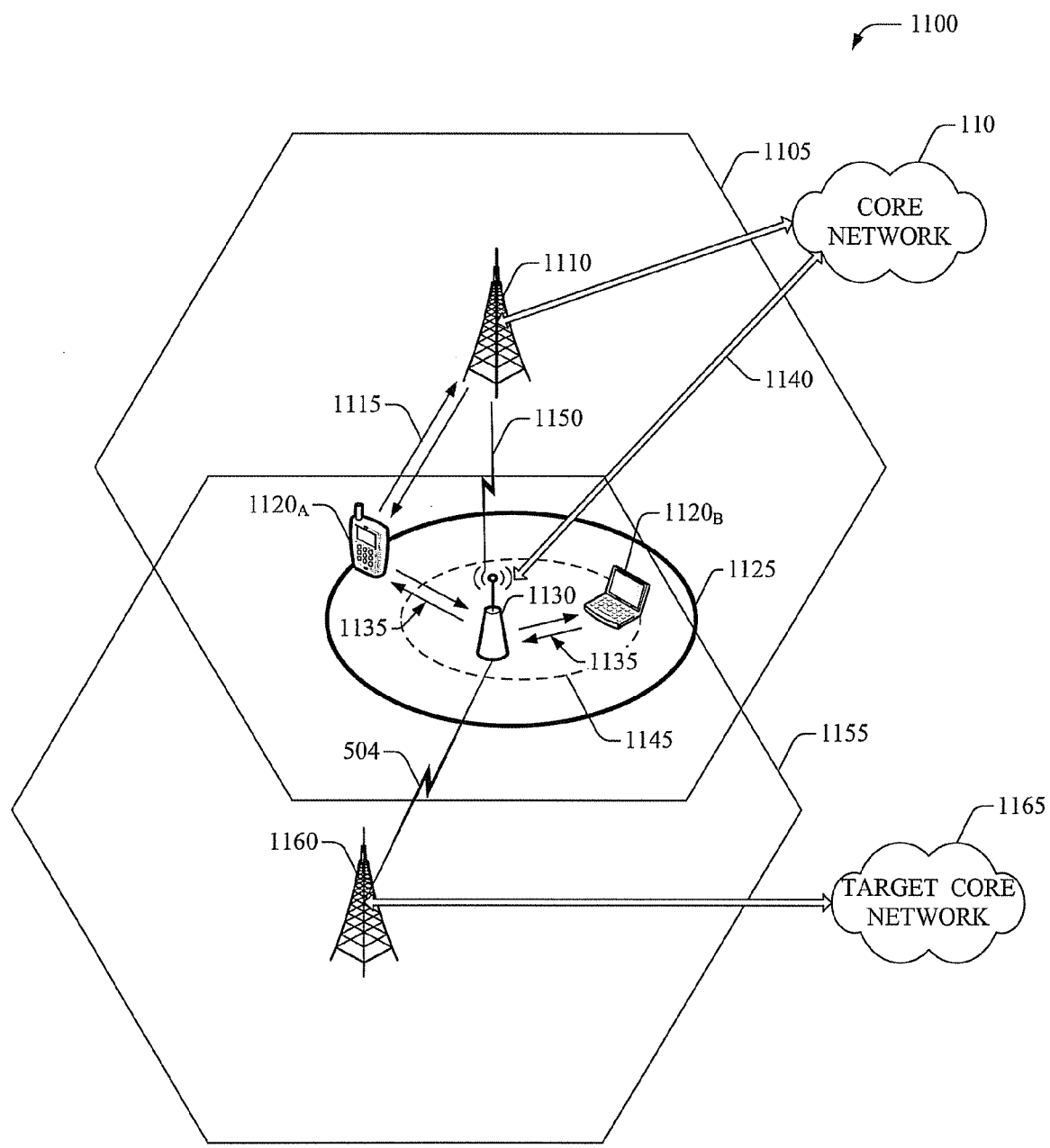
FIG. 11 illustrates an example wireless communication environment with associated components for operation of a femtocell in accordance with the subject specification.

FIG. 11 illustrates a schematic wireless environment 1100 (e.g., a network) in which a femtocell can exploit various aspects of the subject innovation in accordance with the disclosed subject matter. In wireless environment 1100, areas 1105 and 1155 can represent coverage macro cells, which can be served by base stations 1110 and 1160 (coupled to a target core network 1165 that is operated by an acquired service provider) respectively. Macro coverage is generally intended for outdoors locations for servicing mobile wireless devices, like UE $1120_A$, and such coverage is achieved via a wireless link 1115. In an aspect, UE 1120 can be a 3GPP Universal Mobile Telecommunication System (UMTS) mobile phone.

Within macro coverage cell 1105, a femtocell 1145, served by a femto access point 1130, can be deployed. A femtocell typically can cover an area 1125 that is determined, at least in part, by transmission power allocated to FAP 1130, path loss, shadowing, and so forth. Coverage area typically can be spanned by a coverage radius that ranges from 20 to 50 meters. Confined coverage area 1145 is generally associated with an indoors area, or a building, which can span about 5000 sq. ft. Generally, FAP 1130 typically can service a number (e.g., a few or more) wireless devices (e.g., subscriber station $1120_B$) within confined coverage area 1145. In an aspect, FAP 1130 can integrate seamlessly with substantially any PS-based and CS-based network; for instance, FAP 1130 can integrate into an existing 3GPP Core via conventional interfaces like Iu-CS, Iu-PS, Gi, Gn. In another aspect, FAP 1130 can exploit high-speed downlink packet access in order to accomplish substantive bitrates. In yet another aspect, FAP 1130 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE $1120_A$, can leave macro coverage (e.g., cell 1105) and enters femtocell coverage (e.g., area 1115), as illustrated in environment 1100. A carrier frequency scan can be triggered by the UE $1120_A$, which can detect the FAP 1130. UE $1120_A$ can attempt to attach to the FAP 1130 through transmission and reception of attachment signaling, effected via a FL/RL 1135; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 1120 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes FAP 1130) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 1120 generally can be commanded (through a variety of communication means) to select another LAC/RAC or enter "emergency calls only" mode. It is to be appreciated that this attempt and handling process can occupy significant UE battery, and FAP capacity and signaling resources as well.

When an attachment attempt is successful, UE 1120 can be allowed on femtocell 1125 and incoming voice and data traffic can be paged and routed to the subscriber station through the FAP 1130. It is to be noted also that data traffic is typically routed through a backhaul broadband wired network backbone 1140 (e.g., optical fiber backbone, twisted-pair line, T1/E1 phone line, DSL, or coaxial cable). It is to be noted that as a FAP 1130 generally can rely on a backhaul network backbone 1140 for routing and paging, and for packet communication, substantially any quality of service can handle heterogeneous packetized traffic. Namely, packet flows established for wireless communication devices (e.g., terminals $1120_A$ and $1120_B$) served by FAP 1130, and for devices served through the backhaul network pipe 1140. It is to be noted that to ensure a positive subscriber experience, or perception, it is desirable for FAP 1130 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femtocell coverage area (e.g., area 1125 or area 1145).

Figure 12:
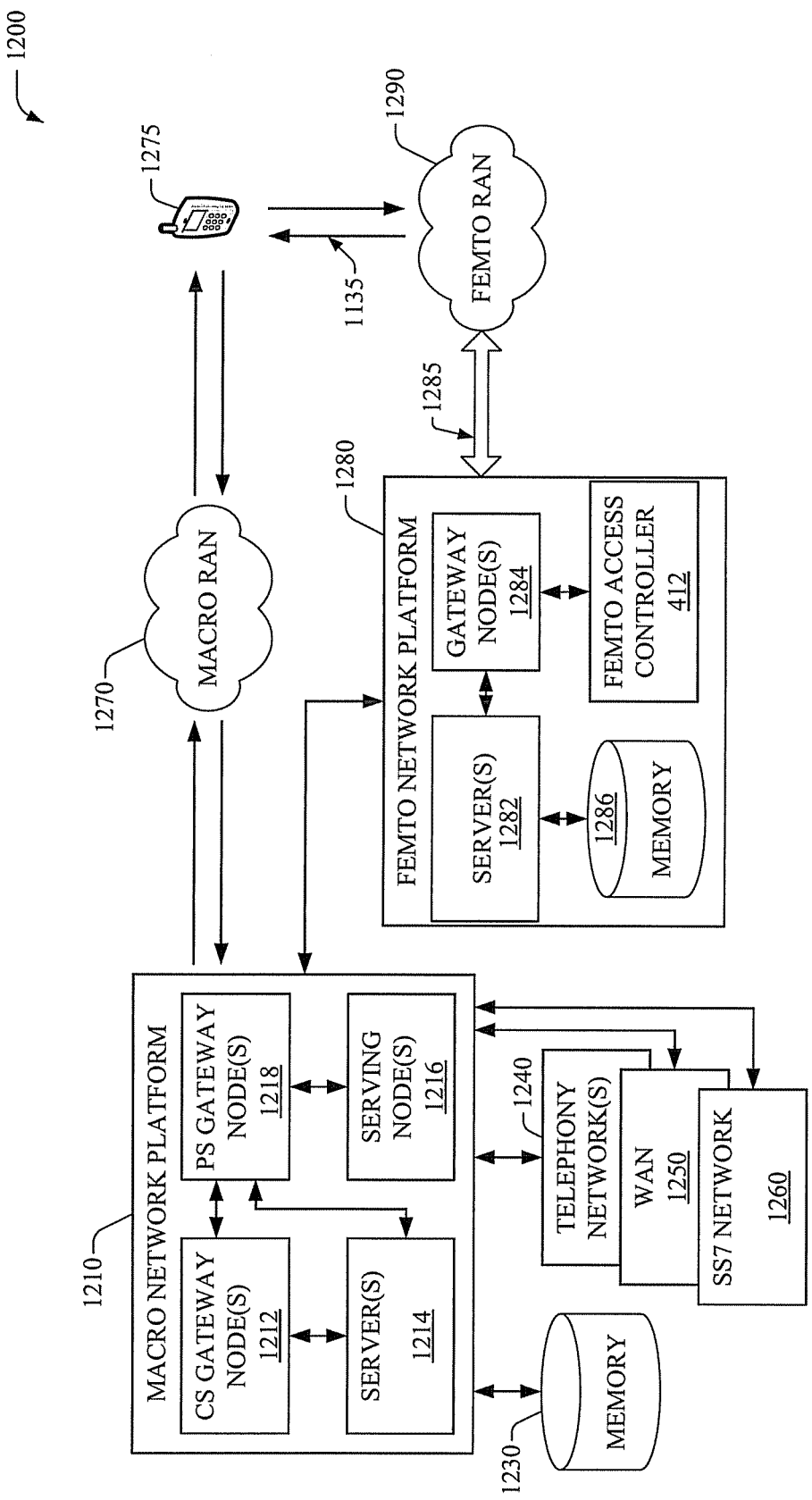
FIG. 12 illustrates a schematic deployment of a macro cell and a femtocell for wireless coverage in accordance with aspects of the disclosure.
Figure 13:
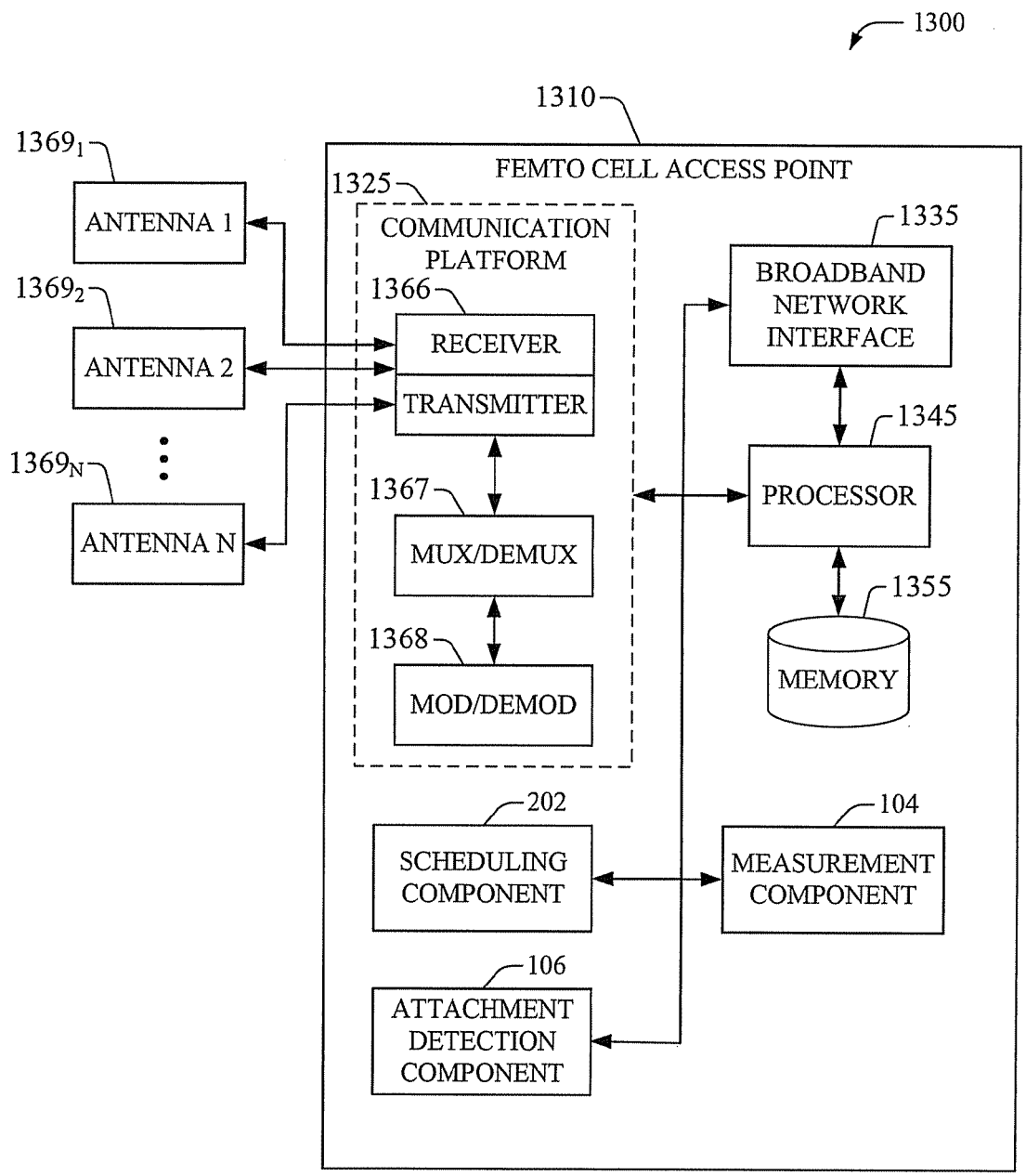
FIG. 13 illustrates an example embodiment of a femto access point that can facilitate merger integration planning by reporting femto measurements, according to the subject disclosure.

To provide further context for various aspects of the subject specification, FIGS. 12 and 13 illustrate, respectively, an example wireless communication environment 1200, with associated components for operation of a femtocell, and a block diagram of an example embodiment 1300 of a femto access point, which can facilitate merger integration planning by reporting femto measurements in accordance with aspects described herein.

Wireless communication environment 1200 includes two wireless network platforms: (i) A macro network platform 1210 that serves, or facilitates communication) with user equipment 1275 via a macro radio access network (RAN) 1270. It should be appreciated that in cellular wireless technologies (e.g., 3GPP UMTS, HSPA, 3GPP LTE, 3GPP UMB), macro network platform 1210 is embodied in a Core Network. (ii) A femto network platform 1280, which can provide communication with UE 1275 through a femto RAN 1290 linked to the femto network platform 1280 via backhaul pipe(s) 1285, wherein backhaul pipe(s) are substantially the same a backhaul link 1140. It should be appreciated that femto network platform 1280 typically offloads UE 1275 from macro network, once UE 1275 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1270 can comprise various coverage cells like cell 1105, while femto RAN 1290 can comprise multiple femtocell access points. As mentioned above, it is to be appreciated that deployment density in femto RAN 1290 is substantially higher than in macro RAN 1270.

Generally, both macro and femto network platforms 1210 and 1280 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1210 includes CS gateway node(s) 1212 which can interface CS traffic received from legacy networks like telephony network(s) 1240 (e.g., public switched telephone network (PSTN), or public land mobile network (PLMN)) or a SS7 network 1260. Moreover, CS gateway node(s) 1212 interfaces CS-based traffic and signaling and gateway node(s) 1218.

In addition to receiving and processing CS-switched traffic and signaling, gateway node(s) 1218 can authorize and authenticate PS-based data sessions with served (e.g., through macro RAN) wireless devices. Data sessions can include traffic exchange with networks external to the macro network platform 1210, like wide area network(s) (WANs) 1250; it should be appreciated that local area network(s) (LANs) can also be interfaced with macro network platform 1210 through gateway node(s) 1218. Gateway node(s) 1218 generates packet data contexts when a data session is established. It should be further appreciated that the packetized communication can include multiple flows that can be generated through server(s) 1214. Macro network platform 1210 also includes serving node(s) 1216 that convey the various packetized flows of information, or data streams, received through gateway node(s) 1218. It is to be noted that server(s) 1214 can include one or more processor configured to confer at least in part the functionality of macro network platform 1210. To that end, the one or more processor can execute code instructions stored in memory 1230, for example.

In example wireless environment 1200, memory 1230 stores information related to operation of macro network platform 1210. Information can include business data associated with subscribers; market plans and strategies, e.g., promotional campaigns, business partnerships; operational data for mobile devices served through macro network platform; service and privacy policies; end-user service logs for law enforcement; and so forth. Memory 1230 can also store information from at least one of telephony network(s) 1240, WAN(s) 1250, or SS7 network 1260.

Femto gateway node(s) 1284 have substantially the same functionality as PS gateway node(s) 1218. Additionally, femto gateway node(s) 1284 can also include substantially all functionality of serving node(s) 1216. In an aspect, femto gateway node(s) 1284 facilitates handover resolution, e.g., assessment and execution. Server(s) 1282 have substantially the same functionality as described in connection with server (s) 1214 and can include one or more processors configured to confer at least in part the functionality of macro network platform 1210. Moreover, the analysis component 414 can be implemented or executed by server(s) 1282 and/or server(s) 1214. To that end, the one or more processor can execute code instructions stored in memory 1286, for example.

Memory 1286 can include information relevant to operation of the various components of femto network platform 1280. For example operational information that can be stored in memory 1286 can comprise, but is not limited to, subscriber information; contracted services; maintenance and service records; femtocell configuration (e.g., devices served through femto RAN 1290; access control lists, or white lists); service policies and specifications; privacy policies; add-on features; femto measurement data, and so forth With respect to FIG. 13, in example embodiment 1300, femtocell AP 1310 can receive and transmit signal(s) (e.g., traffic and control signals) from and to wireless devices, access terminals, wireless ports and routers, etc., through a set of antennas $1369_1$-$1369_N$. It should be appreciated that while antennas $1369_1$-$1369_N$ are a part of communication platform 1325, which comprises electronic components and associated circuitry that provides for processing and manipulating of received signal(s) (e.g., a packet flow) and signal(s) (e.g., a broadcast control channel) to be transmitted. In an aspect, communication platform 1325 includes a transmitter/receiver (e.g., a transceiver) 1366 that can convert signal(s) from analog format to digital format upon reception, and from digital format to analog format upon transmission. In addition, receiver/transmitter 1366 can divide a single data stream into multiple, parallel data streams, or perform the reciprocal operation. Coupled to transceiver 1366 is a multiplexer/demultiplexer 1367 that facilitates manipulation of signal in time and frequency space. Electronic component 1367 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1367 can scramble and spread information (e.g., codes) according to substantially any code known in the art; e.g., Hadamard-Walsh codes, Baker codes, Kasami codes, polyphase codes, and so on. A modulator/demodulator 1368 is also a part of operational group 1325, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1310 also includes a processor 1345 configured to confer functionality, at least partially, to substantially any electronic component in the femto access point 1310, in accordance with aspects of the subject innovation. In particular, processor 1345 can facilitate FAP 1310 to implement configuration instructions received through communication platform 1325, which can include storing data in memory 1355. In addition, processor 1345 facilitates FAP 1310 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1345 can manipulate antennas $1369_1$-$1369_N$ to facilitate beamforming or selective radiation pattern formation, which can benefit specific locations (e.g., basement, home office . . . ) covered by FAP; and exploit substantially any other advantages associated with smart-antenna technology. Memory 1355 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1355 can store configuration information such as schedules and policies; FAP address(es) or geographical indicator(s); access lists (e.g., white lists); license (s) for utilization of add-features for FAP 1310, and so forth. In one example, data store 108 can be implemented in memory 1355.

In embodiment 1300, processor 1345 is coupled to the memory 1355 in order to store and retrieve information necessary to operate and/or confer functionality to communication platform 1325, broadband network interface 1335 (e.g., a broadband modem), and other operational components (e.g., multimode chipset(s), power supply sources . . . ; not shown) that support femto access point 1310. The FAP 1310 can further include a measurement component 104, attachment detection component 106, and scheduling component 202, which can include functionality, as more fully described herein, for example, with regard to systems 100-500. In addition, it is to be noted that the various aspects disclosed in the subject specification can also be implemented through (i) program modules stored in a computer-readable storage medium or memory (e.g., memory 1286 or memory 1355) and executed by a processor (e.g., processor 1345), or (ii) other combination(s) of hardware and software, or hardware and firmware.

Figure 14:
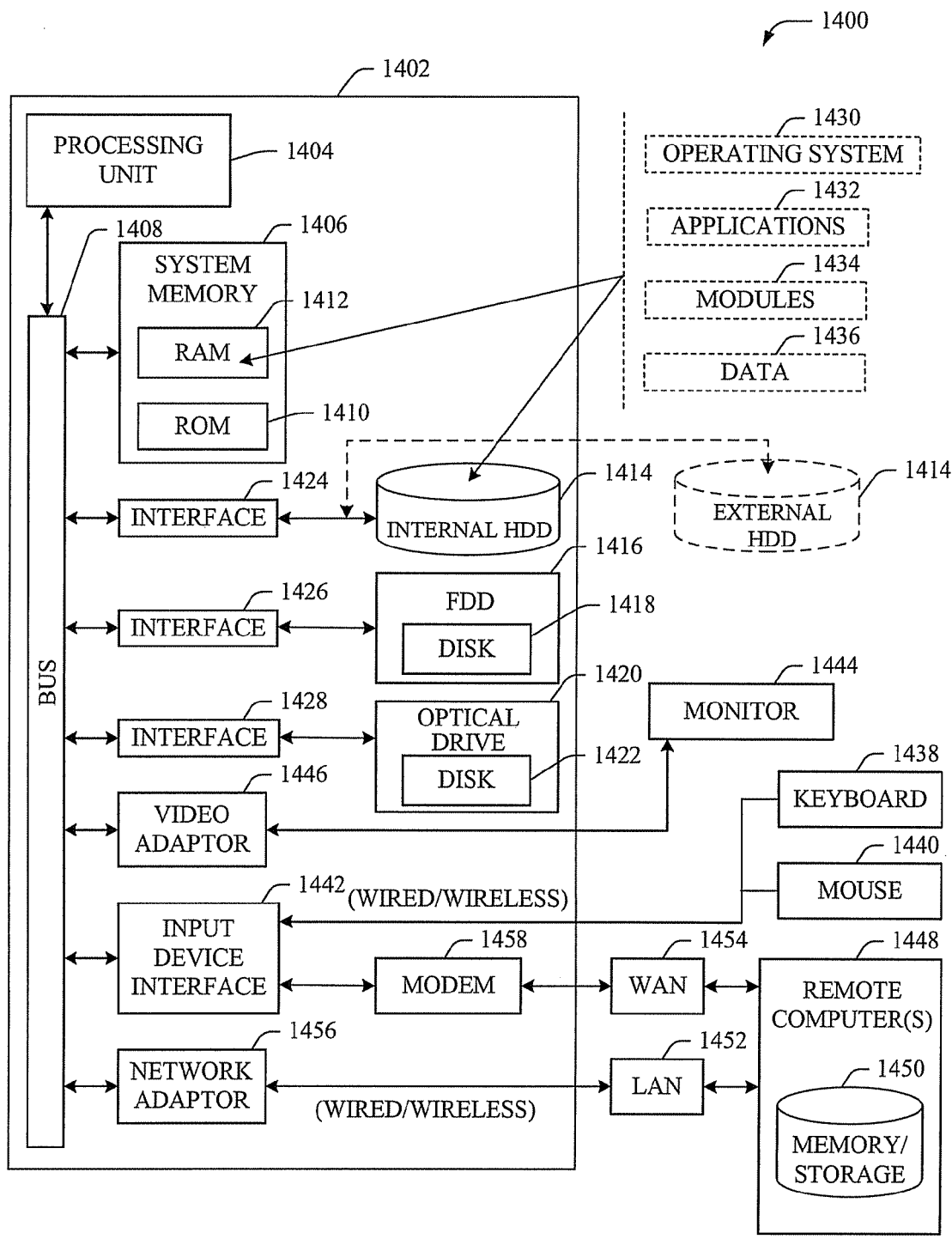
FIG. 14 illustrates a block diagram of a computer operable to execute the disclosed communication architecture.

Referring now to FIG. 14, there is illustrated a block diagram of a computer operable to execute the disclosed communication architecture. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various aspects of the specification includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving report data indicative of a report from a femto access point device deployed in a communication network, wherein the report data comprises measurement data indicative of a radio environment of the femto access point device and attachment data indicative of a number of attachment attempts that have requested connection to the femto access point device; and
based on an analysis of the report data, determining area data indicative of an area at which a signal parameter associated with a signal received from a macro access point device is less than a defined signal parameter threshold.

2. The system of claim 1, wherein the signal parameter comprises a signal strength parameter that represents a strength of the signal.

3. The system of claim 1, wherein the operations further comprise:
based on the attachment data, assigning a weight to the area.

4. The system of claim 1, wherein the communication network is a first communication network, the signal is a first signal, and the measurement data comprises identity data indicative of a set of physical cell identities corresponding to of a set of cell sites of a second communication network that provides, for a location of the femto access point device, a second signal having a greater signal strength than that of the first signal.

5. The system of claim 4, wherein the operations further comprise:
    initiating storage of the identity data to a network data store.

6. The system of claim 4, wherein the operations further comprise:
    sorting the set of cell sites based on the attachment data.

7. The system of claim 1, wherein the determining the area data comprises determining the area data based on location data indicative of a location of the femto access point device.

8. The system of claim 1, wherein the operations further comprise:
    based on the report data, performing an analysis that determines value data indicative of a value of deploying an access point device within the area with respect to cost data indicative of a cost of the deploying.

9. The system of claim 1, wherein the signal is a first signal, the signal parameter is a first signal parameter, and the operations further comprise:
    in response to determining that an access point device has been deployed within the area, verifying that a second signal parameter associated with a second signal received from the access point device is greater than the defined signal parameter threshold.

10. A method, comprising:
    receiving, by a system comprising a processor, report data from a femto access point device deployed in a communication network, wherein the report data comprises measurement data representing a radio environment of the femto access point device and attachment data representing a number of attachment attempts that request connection to the femto access point device; and
    based on the report data, determining, by the system, area data indicative of an area at which a signal parameter associated with a signal received from a macro access point device is less than a defined signal parameter threshold.

11. The method of claim 10, wherein the determining comprises determining the area data based on location data indicative of a location of the femto access point device.

12. The method of claim 10, wherein the communication network is a first communication network, the macro access point device is a first macro access point device, and the method further comprises:
    based on the measurement data, determining, by the system, identifier data indicative of a second macro access point device of a second communication network; and
    based on the attachment data, assigning by the system, a weight to the identifier data.

13. The method of claim 12, wherein the femto access point device is a first femto access point device, the report data is first report data, the measurement data is first measurement data, the attachment data is first attachment data, the radio environment is a first radio environment, the number is a first number, the identifier data is first identifier data, the weight is a first weight, and the method further comprises:
    receiving, by the system, second report data from a second femto access point device deployed in the first communication network, wherein the second report data comprises second measurement data representing a second radio environment of the second femto access point device and attachment data representing a second number of attachment attempts that request connection to the second femto access point device;
    based on the second measurement data, determining, by the system, second identifier data indicative of a third macro access point device of a second communication network; and
    based on the second attachment data, assigning by the system, a second weight to the second identifier data.

14. The method of claim 13, wherein the assigning the second weight comprises assigning the second weight as being less than the first weight in response to determining that the first number is greater than the second number.

15. The method of claim 13, wherein the assigning the second weight comprises assigning the second weight as being greater than the first weight in response to determining that the first number is less than the second number.

16. The method of claim 13, further comprising:
    ranking, by the system, the second macro access point device and the third macro access point device based on the first weight and the second weight.

17. A computer readable storage device comprising instructions that, in response to execution, cause a system comprising a processor to perform operations, comprising:
    receiving report data from a femto access point device deployed in a communication network, wherein the report data comprises measurement data representing a radio environment of the femto access point device and attachment data representing a number of attachment requests received by the femto access point device; and
    based on the report data, determining location data indicative of a location at which a signal parameter associated with a signal received from a macro access point device is less than a defined signal parameter threshold.

18. The computer readable storage device of claim 17, wherein the signal parameter comprises signal strength data that represents a strength of the signal.

19. The computer readable storage device of claim 17, wherein the determining comprises determining the location data based on address data associated with the femto access point device.

20. The computer readable storage device of claim 17, wherein the determining comprises determining the location data based on global positioning system data received from a global positioning system device.

* * * * *